A. T. PAGE.

WIND-WHEEL.

No. 7,056. Reissued April 18, 1876.

Witnesses;
Geo. Lewis
F. M. Kenny

Inventor;
Arthur T. Page.
By Hill Williams
His Attys.

N. PETERS, PHOTO-LITHOGRAPHER, WASHINGTON, D. C.

UNITED STATES PATENT OFFICE.

ARTHUR T. PAGE, OF GARDEN PRAIRIE, ILLINOIS, ASSIGNOR TO THE ECLIPSE WINDMILL COMPANY.

IMPROVEMENT IN WIND-WHEELS.

Specification forming part of Letters Patent No. 146,200, dated January 6, 1874; reissue No. 7,056, dated April 18, 1876; application filed March 28, 1876.

*To all whom it may concern:*

Be it known that I, ARTHUR T. PAGE, of Garden Prairie, in the county of Boone and State of Illinois, have invented certain new and useful Improvements in Wind-Wheels; and I do hereby declare the following to be a full, clear, and exact description of the same, reference being had to the accompanying drawings, forming a part of this specification, in which—

Figure 1:
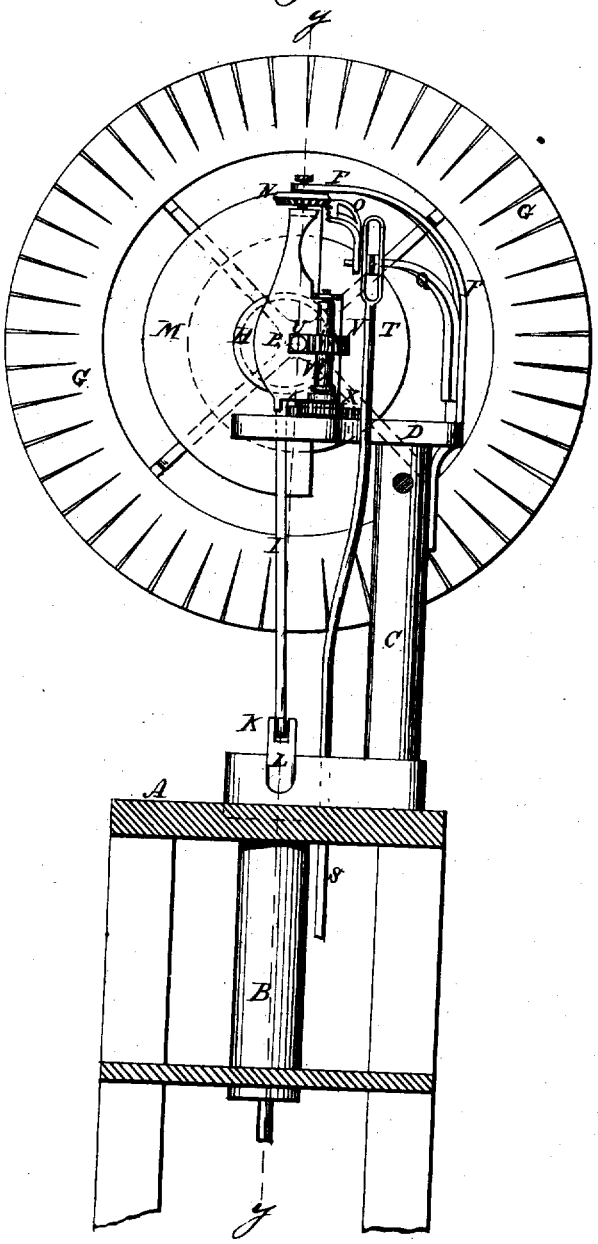
Figure 2:
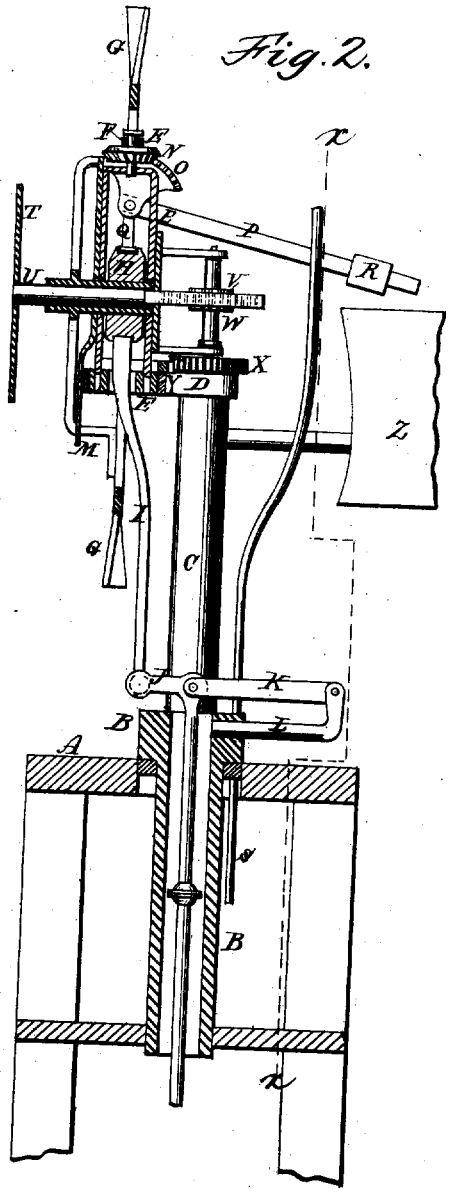

Figure 1 is a rear elevation of my improved wind-wheel, partly in section, through the line *x x*, Fig. 2. Fig. 2 is a vertical section of the same taken through the line *y y*, Fig. 1.

Similar letters of reference in the accompanying drawings denote the same parts.

This invention relates to that class of mills in which the wheel is relieved from undue pressure by swinging laterally out of the wind; and it consists, first, in a new and improved mode of supporting the wind-wheel and the parts immediately connected therewith; secondly, in a new and improved mode of hanging the tail-vane to prevent it from interfering with the wind-wheel, however near the latter may be to its independent vertical axis of rotation or deflection; thirdly, in an improved arrangement of said vertical axis of rotation with relation to the wind-wheel; fourthly, in an improved arrangement of the deflecting surface, which initiates the lateral deflection of the wheel out of the wind; fifthly, in a new auxiliary mechanism for assisting to deflect the wind-wheel; sixthly, in a new combination of devices for connecting the counterbalance-weight with the wind-wheel and the parts which turn with it when it swings out of or into the wind; seventhly, in a new combination of devices for applying the power of the wind-wheel to the machinery to be driven; and, lastly, in the devices and combinations by which the various desired results are effected, substantially as I will now proceed to describe.

In the drawings, A represents the frame or tower by which the wind-wheel is supported. In bearings in the upper part of the frame or tower A works a short vertical hollow shaft or cylinder, B, to one side of the upper end of which is rigidly attached a vertical post, C, having a horizontal arm, D, rigidly attached to its upper end, and forming an offset for the support of the wind-wheel and its connected mechanism, as shown in Fig. 1. The tail-vane Z is attached to the post C so as to keep the front end of the arm D always presented to the wind. The U-shaped support B C D, having the projecting arm D and the clear space between such arm and the arm B beneath it, and having provision for its own axis of rotation at the front end of the lower horizontal arm, and provision for the independent axis of rotation of the laterally-swinging mill-head at the front end of the upper horizontal arm, constitutes one feature of my invention, and possesses several important advantages, among which may be mentioned, first, that while the vertical axis of rotation of the tail-vane and the wind-wheel or laterally-swinging mill-head are substantially in vertical line with each other, yet the support of the tail-vane is brought at a considerable distance to the rear of said vertical axis of the mill-head, thus enabling the wind-wheel to be arranged almost at the axis of rotation of the tail-vane, and yet to swing clear around parallel to the tail-vane without danger of collision or interference with it; secondly, that the clear space between the horizontal parts B D of the support, and in front of the vertical post C, accommodates the working-rods and other mechanism beneath the wind-wheel much better than any other arrangement of which I have knowledge; and, thirdly, that the horizontal arm D, holding the wind-wheel clear of the parts below, enables the wind-wheel shaft to be made considerably shorter, and the wheel at the same time be made very dishing without danger of the rim of the wheel coming in contact with the working-rods or other mechanism below.

The wind-wheel G is supported and pivoted on the arm D in the following manner, viz: The spider or frame of the wheel is made with an offset or dish at or near the inner ends of the fans, so as to form a concavity upon one side of the wheel to receive the pivoting device and bring it into or near the plane of said wheel. The hub of the wind-wheel passes through and revolves in bearings in a frame or vertical pivot, E, and upon said hub, within said pivot-frame E, is formed, or to it is rigidly attached, an eccentric wheel, H, to which is connected, by a strap, the upper end of the rod I, which passes down through the open lower end of the frame E, bends around the rim of the wheel G, and is connected, by a ball-and-socket joint, with the end of the rod J, which is bent at right angles and passes down through the hollow cylinder B, beneath which it connects with the machinery to be driven. The rod J is swiveled so that it may not interfere with the turning of the wheel upon the frame or pivot E, as it is thrown into and out of the wind, nor with the turning of the hollow cylinder B in its bearings as the direction of the wind changes. To the angle of said rod J, at the upper end of the hollow cylinder B, is pivoted the end of a short rod, K, the outer end of which is pivoted to the outer end of an arm, L, formed upon or attached to the upper part of the hollow cylinder B. The device K L prevents friction by keeping the rod J in the middle part of the cavity of the said cylinder B.

The device for initiating the lateral movement of the wind-wheel out of the wind, when the force of the wind becomes too strong for the safety or proper action of the mill, is constructed and arranged as follows: M is a deflecting vane or surface attached to and projecting from the laterally swinging or pivoted support of the wind-wheel, so that a backward pressure upon said vane will deflect it laterally, and cause the wheel and its immediate support to swing in the same direction upon its vertical axis of rotation more or less out of wind. The said deflecting-vane is so arranged with relation to the central opening of the wind-wheel that a portion of the wind which blows through the open center of the wheel furnishes the force that acts upon the vane and causes it to initiate the movement of the wheel out of the wind. This obviates the necessity of projecting the deflecting-vane beyond the outer edge of the wind-wheel, and, by properly dishing the arms of said wheel, enables me to arrange the deflecting-surface in a very convenient and compact manner within the dished center of the wheel. In fact, as herein shown and described, both the deflecting-vane and the independent vertical pivot upon which the wheel swings as it moves out of the wind, may, with my construction of the wheel and its supports, be arranged within the dishing part of the wheel, and the length of the wheel-shaft may be reduced to a minimum.

The wheel, when deflected out of the wind, is returned to its normal position, as the wind subsides, by the following means, viz: To the upper end of the vertical pivoted frame E is fixed a small gear-wheel, N, having teeth around its edge projecting downward, into which teeth mesh the teeth of a curved rack or gear-segment, O, attached to the end of a lever, P, which is pivoted to an arm, Q, rigidly attached to an arm, F. By raising the arm P the gear-segment O will turn the wheel N, and thereby the pivot or frame E, causing the wind-wheel to move out of the wind, and by drawing down the end of the lever P the movement of the parts will be in the opposite direction, thereby returning the wheel into the wind. A weight, R, connected to the outer end of the lever P overbalances the ordinary wind-pressure on the vane M, but yields and relieves the wheel when the wind increases so as to be dangerous. The weight being so hung as to be practically a weight of varying resistance, the wheel, when it begins to be deflected laterally, will only move far enough to cause the lateral wind-pressure to exactly balance the downward pressure of the weight; if, then, the wind continues to increase, the wheel will move farther out till it is again in equilibrium with the weight, and when the wind decreases it will proportionately move back automatically to or toward its normal position with its face to the wind. The outer end of the lever P may be raised or lowered by hand by means of a rod, S, for the purpose of throwing the wheel out of or into the wind, as desired. The following device may be used either additionally to or independently of the deflecting-surface M, for the purpose of automatically initiating the lateral deflection of the wheel, viz: The hub of the wheel G, being made hollow, a small fan or wind-wheel, T, may be attached to the outer end of a shaft, U, which shaft extends through said hub and projects from the rear end thereof, and is provided with lateral cogs or teeth at its inner or rear end. These cogs or teeth mesh into teeth of a small gear-wheel, V, attached to a short vertical shaft, W, which works in bearings in brackets attached to the pivoted frame E. To the lower end of the shaft W is attached a small gear-wheel, X, the teeth of which mesh into the teeth of a segment-gear wheel, Y, attached to the arm D. The pressure of the wind upon the fan T tends to rotate said fan and its shaft U, and the power thus obtained is applied, through the gear-wheels, against the frame D, and by the leverage thereon starts or assists in starting the wind-wheel G out of the wind.

Having thus described my invention, I claim as new and desire to secure by Letters Patent—

1. A windmill combined with a U-shaped support, B C D, substantially as and for the purposes described.

2. The U-shaped support B C D, combined with the tail-vane projecting behind the vertical post C, and with the main axis of rotation at the front end of the lower horizontal arm B, and the independent axis for the lateral movement of the wind-wheel at the front end of the upper horizontal arm D, substantially as described.

3. A windmill having a dishing wind-wheel, and the independent vertical axis of rotation of the wheel and head arranged within the dishing part of said wheel, substantially as herein shown and described.

4. The combination of the U-shaped support B C D, the vertical frame or axis E, supported at the forward end of the arm D, and the dishing wheel G, substantially as described.

5. In a windmill in which the wheel is relieved from over-pressure by lateral deflection out of the wind, the combination of an open-center wind-wheel with a deflecting surface attached to the wind-wheel support and arranged in such relation to said open center that the wind, blowing through the open center, forces said surface out of its path and thus initiates the lateral deflection of the wheel out of the wind, substantially as described.

6. The combination of an open-center wind-wheel, having an independent vertical axis of motion on which it can swing bodily out of the wind, with a deflecting vane or surface, arranged at said open center and attached to the wheel-support, whereby the lateral deflection of said surface by the wind at the center of the wheel deflects the wheel out of the wind, substantially as described.

7. The combination of a dishing open-center wind-wheel with a deflecting-vane, attached to the wind-wheel support and arranged within the dishing part of the wheel, whereby the wheel is laterally deflected out of the wind, substantially as described.

8. The combination of a dishing open-center wind-wheel with an independent vertical axis of deflection and a deflecting-surface, both arranged and operating within the dishing part of the wheel, substantially as described.

9. The combination of a wind-wheel which relieves itself of undue wind-pressure by swinging bodily out of the wind, an auxiliary independent wind-wheel, having the same support as the main wind-wheel, and a train of mechanism by which the power of said auxiliary wind-wheel is applied to turn the common support of both wheels on its vertical axis of rotation, and thus throw, or assist in throwing, them both out of the wind, substantially as described.

10. The combination of the center fan T, the toothed shaft U, the gear-wheels V X, and the stationary segmental gear-wheel Y, with the hollow hub of the wheel G and the pivoted frame E, supporting the main wind-wheels, substantially as described.

11. The combination of a wind-wheel which relieves itself automatically by lateral deflection out of the wind, a gear-rim, N, attached to the wind-wheel support, and having downwardly-projecting teeth, and a gear-segment, O, attached to or forming part of a weight-lever, P, which is pivoted independently of the said wind-wheel support, substantially as and for the purposes described.

12. The combination of the bent rod I, rod J, lever K, and arm L with the U-shaped support B C D and dishing wind-wheel, substantially as described.

ARTHUR T. PAGE.

Witnesses:
W. H. WHEELER,
OTHO H. ORTON.